United States Patent
Sy et al.

(10) Patent No.: US 8,322,483 B2
(45) Date of Patent: Dec. 4, 2012

(54) STEERING ANGLE SENSOR

(75) Inventors: Williamson Sy, Tokyo (JP); John Casari, Manchester, MI (US); Christoph Schmidt, Hamburg (DE); Vasile Coica, Sterling Heights, MI (US)

(73) Assignee: Robert Bosch GmbH, Stuttgart (DE)

( * ) Notice: Subject to any disclaimer, the term of this patent is extended or adjusted under 35 U.S.C. 154(b) by 728 days.

(21) Appl. No.: 12/560,204

(22) Filed: Sep. 15, 2009

(65) Prior Publication Data

US 2011/0061962 A1 Mar. 17, 2011

(51) Int. Cl.
*B62D 3/00* (2006.01)
*B62D 6/00* (2006.01)

(52) U.S. Cl. .................. 180/444; 180/402; 324/207.25

(58) Field of Classification Search .............. 180/402, 180/409, 410, 443, 444; 324/207.25
See application file for complete search history.

(56) References Cited

U.S. PATENT DOCUMENTS

| | | | |
|---|---|---|---|
| 4,297,573 A | 10/1981 | Becchi et al. |
| 4,614,869 A | 9/1986 | Hoshino et al. |
| 4,631,478 A | 12/1986 | Knetsch et al. |
| 4,789,342 A | 12/1988 | Shitanoki |
| 5,004,915 A | 4/1991 | Umehara et al. |
| 5,088,319 A | 2/1992 | Hirose et al. |
| 5,149,273 A | 9/1992 | Bannai et al. |
| 5,171,157 A | 12/1992 | Bolen |
| 5,195,383 A | 3/1993 | Tanaka et al. |
| 5,218,769 A | 6/1993 | Tranchon |
| 5,304,071 A | 4/1994 | Bannai et al. |
| 5,309,758 A | 5/1994 | Kubota et al. |
| 5,314,344 A | 5/1994 | Ida et al. |
| 5,734,160 A | 3/1998 | Chung et al. |
| 5,818,038 A | 10/1998 | Kerkmann et al. |
| 5,930,905 A | 8/1999 | Zabler et al. |
| 6,008,457 A | 12/1999 | Klein et al. |
| 6,282,968 B1 | 9/2001 | Sano et al. |

(Continued)

FOREIGN PATENT DOCUMENTS

DE 4110593 10/1992

(Continued)

OTHER PUBLICATIONS

Dyntu, M.P. et al. "Piezoresistance effect in Pb Te semiconductor microwires deformed by bending" Semiconductor Conference 1998, CAS '98 Proceedings, 1998. International, Oct. 6-10, 1998, vol. 2, pp. 459-462.

(Continued)

*Primary Examiner* — Tony Winner
(74) *Attorney, Agent, or Firm* — Michael Best & Friedrich LLP

(57) ABSTRACT

An apparatus for determining an amount of rotation of a rotatable component that rotates with respect to a stationary component. The apparatus includes a cable with a first end fixed to the rotatable component and a second end fixed to the stationary component. The cable, which supports a sensing element, is configured to wind or unwind when the rotatable component rotates with respect to the stationary component. The sensing element extends along a length of the cable and is configured to flex in response to the winding or unwinding of the cable. The sensing element has a resistance that changes in response to flexion of the sensing element. An evaluation circuit is connected to the sensing element and is configured to determine a value having a relation to the resistance and determine the amount of rotation based on the value.

20 Claims, 6 Drawing Sheets

U.S. PATENT DOCUMENTS

| | | | |
|---|---|---|---|
| 6,341,426 B1 | 1/2002 | Okumura | |
| 6,362,719 B1 | 3/2002 | Osmer et al. | |
| 6,474,146 B2 | 11/2002 | Okumura | |
| 6,486,767 B1 | 11/2002 | Rainey | |
| 6,541,962 B1 | 4/2003 | Borgmann et al. | |
| 6,943,544 B2 | 9/2005 | Waffenschmidt | |
| 7,365,304 B2 | 4/2008 | Fleissner | |
| 7,584,818 B2 * | 9/2009 | Choi et al. | 180/444 |
| 2007/0273165 A1 | 11/2007 | Beck et al. | |
| 2008/0000712 A1 * | 1/2008 | Tanaka et al. | 180/409 |

FOREIGN PATENT DOCUMENTS

| | | |
|---|---|---|
| DE | 19946095 | 10/2000 |
| EP | 1074454 | 12/2005 |
| JP | 11051607 | 2/1999 |

OTHER PUBLICATIONS

Ikuta, K. et al. "Shape memory alloy servo actuator system with electric resistance feedback and application for active endoscope" Robotics and Automation, 1988. Proceedings., IEEE International Conference on, Apr. 24-29, 1988, vol. 1, pp. 427-430.

eFunda, "Electric Resistance Strain Gages" [Retrieved from the Internet Apr. 21, 2009] Available at URL <http://waybackmachine.org/web/20090504035736/http://www.efunda.com:80/designstandards/sensors/strain_gages/strain_gage_theory.cfm, May 4, 2009 (2 pages).

eFunda, Sensitivity of Strain Gage Wire Materials: [Retrieved from the Internet Apr. 21, 2009] Available at URL <http://waybackmachine.org/web/20090227061509/http://efunda.com:80/designstandards/sensors/strain_gages/strain_gage_sensitivity.cfm Feb. 27, 2009 (3 pages).

* cited by examiner

STEERING ANGLE SENSOR

FIELD OF THE INVENTION

The invention relates to angle sensors. More specifically, the invention relates to angle sensors operable to sense an electrical parameter that changes in response to rotational movement.

BACKGROUND

Steering angle sensors are mounted to the vehicle, typically within the steering column so users do not see them. Some steering angle sensors are composed of two parts, a sensing unit and a magnet. The sensing unit is mounted in the steering unit and is aimed toward the magnet. The magnet is mounted on the steering wheel such that the magnet rotates with the steering wheel. The sensing unit senses the rotational movement of the magnet, which is used to determine an angle of rotation of the steering wheel.

SUMMARY

The invention provides a cost effective sensor that can be mounted in a housing in the steering column. Alternatively, a separate housing can be formed for the sensor and it can be positioned at any position along the drive shaft and the axle.

In one embodiment, the invention provides an apparatus for determining an amount of rotation of a rotatable component rotating with respect to a stationary component. The apparatus includes a cable with a first end fixed to the rotatable component and a second end fixed to the stationary component. The flat cable is configured to wind or unwind when the rotatable component rotates with respect to the stationary component. A sensing element is supported by the cable. The sensing element extends along a length of the cable and is configured to flex in response to the winding or unwinding of the cable. The sensing element has a resistance that changes in response to flexion of the sensing element. An evaluation circuit is in communication with the sensing element and is configured to determine a value having a relation to the resistance and to determine the amount of rotation based on the value.

In another embodiment, the invention provides a vehicle that includes a drive shaft, a steering column, a steering device, and an angle sensor. The drive shaft is configured to drive a wheel of the vehicle. The steering column includes a movable component and a stationary component. The movable component is coupled to the drive shaft. The steering device is coupled to the movable component and is configured to rotate the movable component with respect to the stationary component. The angle sensor is configured to determine an amount of rotation of the movable component with respect to the stationary component. The angle sensor includes a housing, a strip of material, a sensing element, and an evaluation circuit. The housing includes a movable housing portion and a stationary housing portion. The strip of material has a first end fixed to the movable housing portion and a second end fixed to the stationary housing portion. The strip of material is configured to move when the movable housing portion moves with respect to the stationary housing portion. The sensing element is supported by the strip of material. The sensing element extends along a length of the strip of material and is configured to flex in response to the movement of the strip of material. The sensing element has a resistance that changes in response to flexion of the sensing element. The evaluation circuit is connected to the sensing element. The evaluation circuit is configured to determine an electrical value having a relation to the resistance and determine the amount of rotation of the movable component based on the electrical value.

In yet another embodiment, the invention provides a method of sensing an angle of rotation using an angle sensor. The angle sensor includes a strip of material with a first end fixed to a stationary component and a second end fixed to a rotary component that rotates with respects to the stationary component. The method includes moving a sensing element mounted on the strip of material such that the sensing element flexes in response to rotation of the rotary component, sensing a change in an electrical value that has a relation to the resistance of the sensing element in response to flexion of the sensing element, and determining the angle of rotation from the change in the electrical value.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
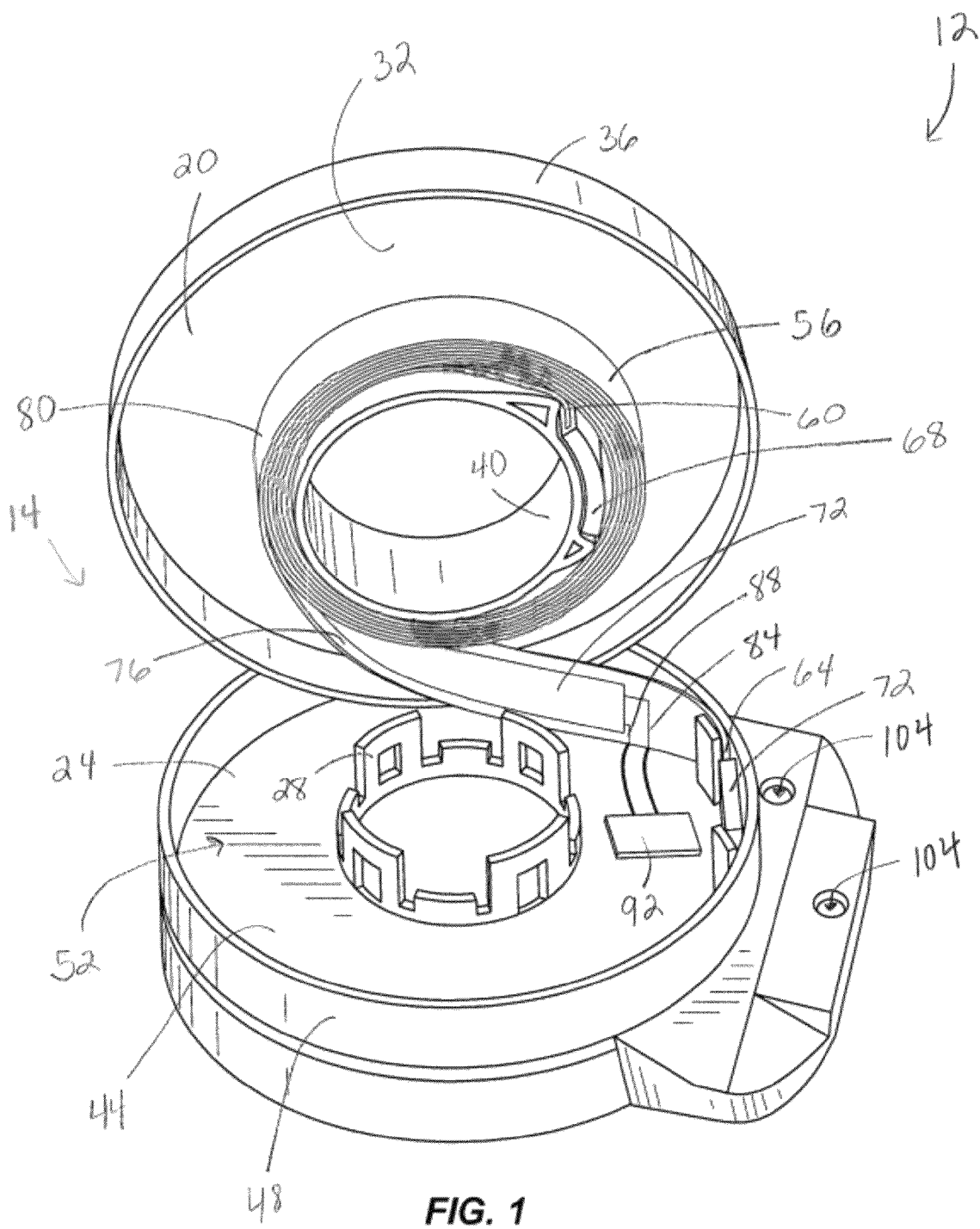
FIG. 1 is a partially exploded view of an angle sensing apparatus in accordance with the invention.
Figure 4:
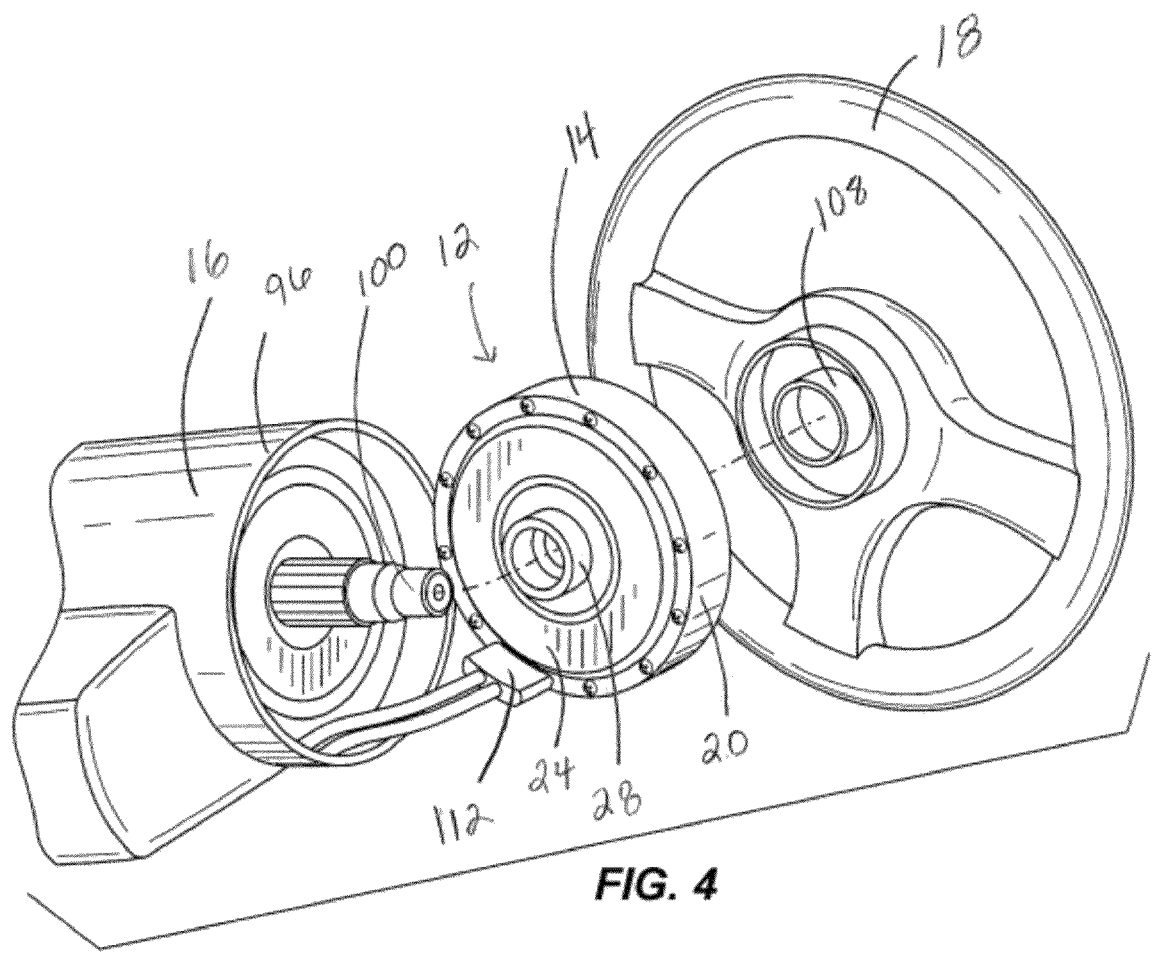
FIG. 4 is a partially exploded view of the angle sensing apparatus of FIG. 1 mounted in a vehicle.

FIG. 1 provides an angle sensor 12 having a housing 14. The angle sensor 12 senses an electrical value indicative of a degree of rotation between a stationary component, such as a steering column 16 (FIG. 4), and a rotatable component, such as a steering wheel 18 (FIG. 4).

As shown in FIG. 1, the angle sensor 12 includes a housing 14 formed in two halves, a rotatable housing portion 20 and a stationary housing portion 24. The stationary housing portion 24 further includes a mounting portion 28 that is rotatable with respect to the stationary housing portion 24. The rotatable housing portion 20 includes a top surface 32, an outer wall 36, and an inner wall 40. The outer wall 36 and the inner wall 40 are substantially cylindrically shaped. The stationary housing portion 24 includes a bottom surface 44 and an outer wall 48. The rotatable housing portion 20 cooperates with the stationary housing portion 24 to define a chamber 52 therebetween.

A flat cable 56 is positioned within the chamber 52. The flat cable 56 is connected at a first end 60 to the rotatable housing portion 20 and at a second end 64 to the stationary housing portion 24. It is envisioned that other strips of material or cables can be used in place of the flat cable 56. In the illustrated construction, the flat cable winds around the inner wall 40 of the rotatable housing portion 20. The first end 60 of the flat cable 56 is secured to the inner wall 40 by a plastic clip 68. The flat cable 56 winds around the inner wall 40 within the chamber 52. The second end 64 of the flat cable 56 is secured to the outer wall 48 of the stationary housing portion 24 by a second plastic clip 72. In other constructions the flat cable 56 is secured to the rotatable housing portion 20 and the stationary housing portion 24 using adhesive or by other suitable means. It is also envisioned that the flat cable 56 can be wound in other winding configurations than the configuration shown. For example, the flat cable 56 can be wound with a loop divider as is known in the art.

Figure 2:
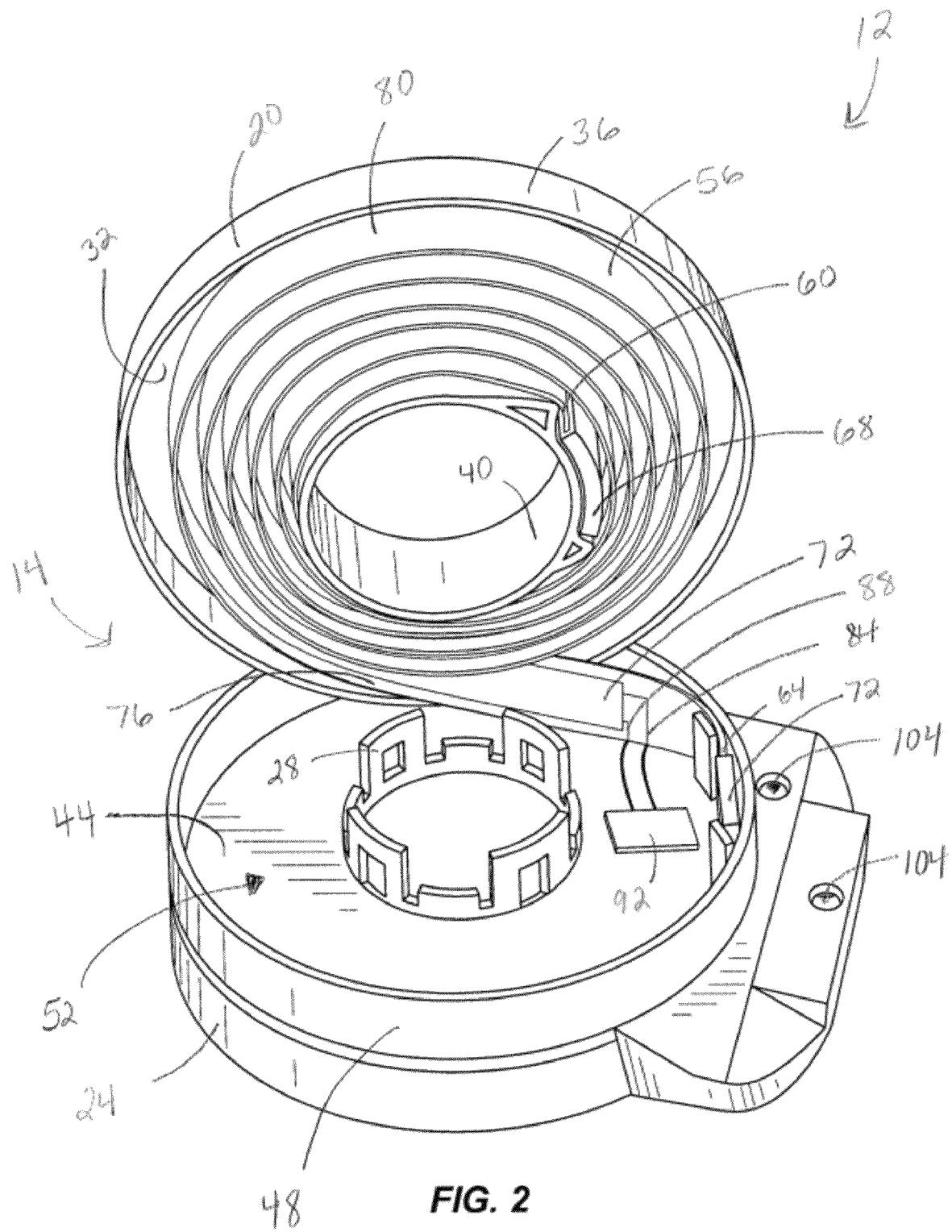
FIG. 2 is a second partially exploded view of the angle sensing apparatus of FIG. 1.
Figure 3:
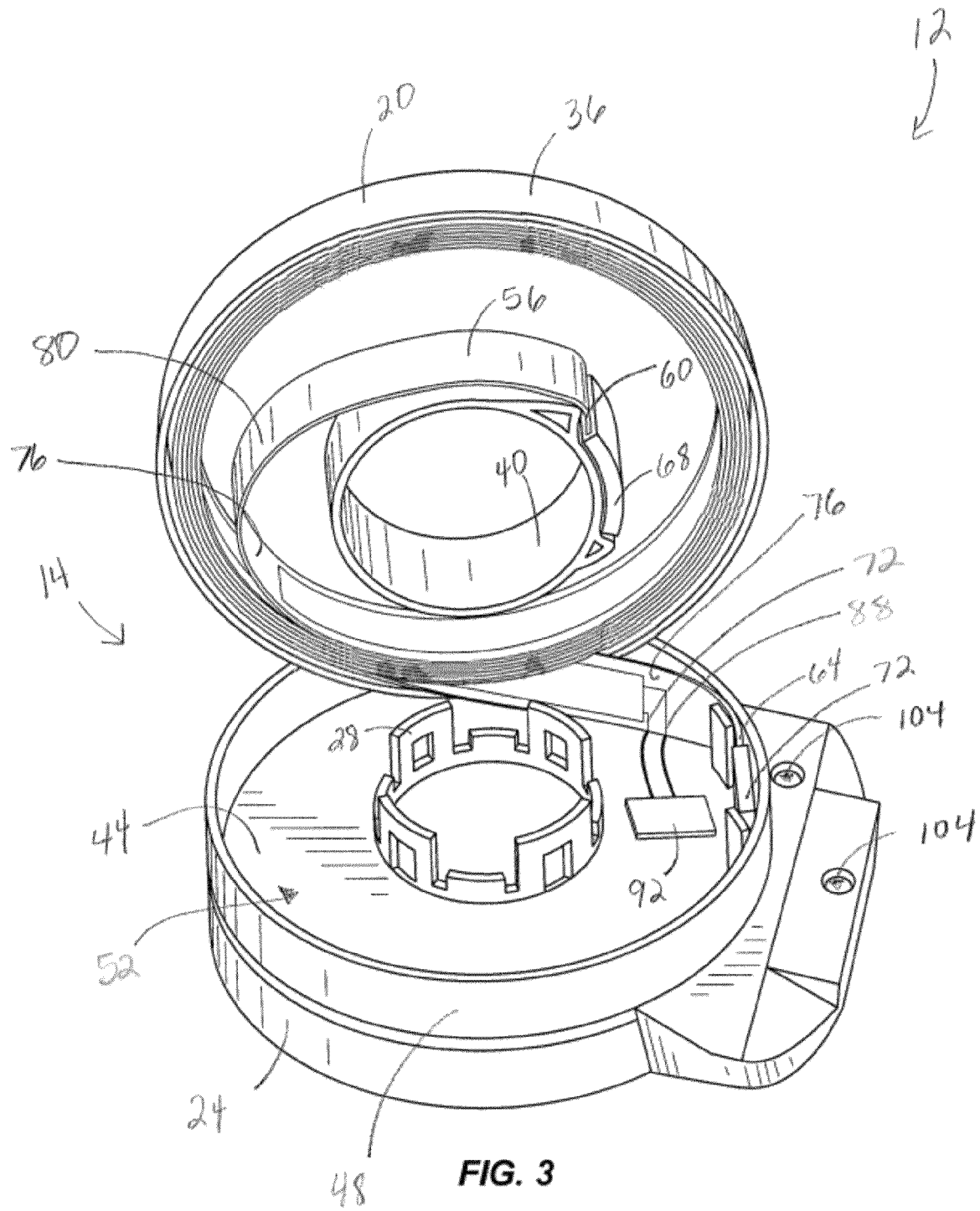
FIG. 3 is a third partially exploded view of the angle sensing apparatus of FIG. 1.

The flat cable 56 contains substantially no tension. Thus, when the rotatable housing portion 20 is rotated with respect to the stationary housing portion 24, the flat cable 56 does not affect the movement. As the rotatable housing portion 20 is rotated with respect to the stationary housing portion 24, the flat cable 56 moves between a fully wound position (FIG. 1), an intermediate position (FIG. 2), and a fully unwound position (FIG. 3).

As illustrated in FIG. 1, when the flat cable 56 is in the fully wound position, the flat cable 56 is positioned adjacent the inner wall 40. In the illustrated construction, the rotatable housing portion 20 is rotated in a counterclockwise direction with respect to the stationary housing portion 24 to wind the flat cable 56. Although the flat cable 56 is fully wound, there is substantially no tension in the cable 56. As the rotatable housing portion is wound in a clockwise direction with respect to the stationary housing portion 24, the flat cable 56 begins to unwind. FIG. 2 illustrates one example of the flat cable 56 in a position between the fully wound position and the fully unwound position of FIG. 3. Although the flat cable 56 is illustrated as being evenly distributed throughout the chamber 52, the flat cable 56 has substantially no tension to aid in the distribution. Thus, the flat cable 56 may be positioned or unevenly distributed throughout the chamber 52 when in an intermediate position. FIG. 3 illustrates the flat cable 56 in the fully unwound position. When the flat cable 56 is fully unwound, it tends to be distributed adjacent the outer wall 36 of the rotatable housing portion 20. In some constructions, the flat cable 56 includes two full revolutions around the inner wall 40 when fully unwound and eight full revolutions when fully wound. Of course, the flat cable may be a different length and a have a different number of full revolutions when fully wound and unwound.

A sensor strip 72 is mounted on the flat cable 56 and is configured to move with the cable. In the illustrated construction, the sensor strip 72 is mounted on the inner side 76 of the flat cable. In other constructions, the sensor strip 72 can be mounted on the outer side 80 of the flat cable. The flat cable 56 acts as a carrier for the sensor strip 72. As the flat cable 56 winds or unwinds, the sensor strip 72 moves with the flat cable 56 cable and, thus, also winds or unwinds without interfering with the movement of the flat cable 56. A positive lead wire 84 and a ground lead wire 88 extend from the sensor strip 72 and are electrically connected to the evaluation circuit 92.

In some angle sensing applications, the angle sensor 12 is configured to sense an angle of rotation of the steering wheel 18 with respect to the steering column 16. As illustrated in FIG. 4, the angle sensor 12 may be positioned in the steering column 16. The steering column 16 includes a stationary component 96 and a rotary component 100. The mounting portion 28 of the stationary housing portion 24 is mounted to the rotary component 100. The stationary housing portion 24 if fixedly mounted to the stationary component 96. The stationary housing portion 24 includes a plurality of apertures 104 (see FIGS. 1-3) configured to receive fasteners that are also received in corresponding apertures in the steering column 16. The mounting portion 28 is received in the inner wall 40 (FIGS. 1-3). A cylindrical mounting portion 108 of the steering wheel 18 is received in the mounting portion 28. Thus, the mounting portion 28 is disposed between the inner wall 40 and the mounting portion 108 such that rotation of the steering wheel 18 causes simultaneous rotation of the mounting portion 28, the rotatable housing portion 20, and the rotary component 100 of the steering column. The rotation of the rotary component 100 of the steering column causes a pair of wheels 110 (see FIG. 8) of the vehicle to rotate with rotation of the steering wheel 18. For simplicity, operation of the angle sensor 12 will be discussed in relation to the construction of FIG. 4, in which rotation of a steering wheel 18 causes rotation of the rotatable housing portion 20.

The steering column 16 also includes a plug 112 that electrically connects the components in the angle sensor 12 to other components of the vehicle such as the electronic control unit, battery, etc. In some constructions, the plug 112 also provides an electrical connection between the components of the vehicle and electrical components positioned in the steering wheel 18 such as radio controls, air bag sensors, etc.

Figure 5:
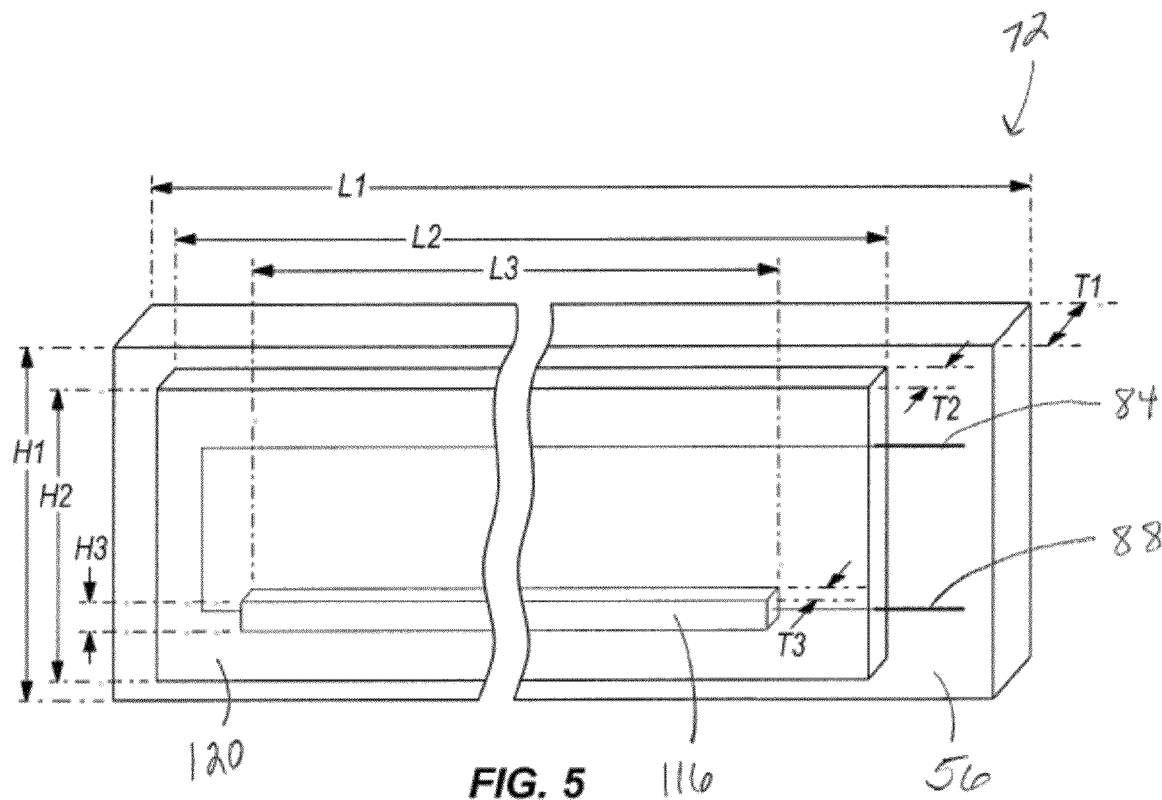
FIG. 5 is a perspective view of a sensing element mounted to a cable.

FIG. 5 illustrates the sensor strip 72 in greater detail. The positive lead wire 84 and the ground lead wire 88 are coupled to a sensing element 116. A protective laminate 120 covers the sensing element 116 and at least a portion of the positive and ground lead wires 84 and 88. The protective laminate 120 protects the sensing element 116 and the covered portion of the lead wires 84 and 88 from damage due to environmental factors (e.g., moisture, debris, etc.) and also mounts the sensing element 116 and the lead wires 84 and 88 on the flat cable 56. In some constructions, the sensing element 116 may be mounted using adhesive or other means. In yet other constructions, the sensing element 116 may not be mounted on the flat cable 56.

One example of a sensing element 116 that can be used with the angle sensor 12 is a sensing element 116 with resistive properties that change as the sensing element 116 undergoes flexion. One example of a variable resistance sensing element 116 is a conductive element with discontinuities or cracks in it. When the sensing element 116 flexes, the cracks open and close, depending on the direction of flexion. When the sensing element 116 is flexed and the discontinuities open, electricity has a more difficult time flowing through the sensing element 116 and, thus, the resistance of the sensing element 116 increases. Similarly, when the sensing element 116 is flexed and the discontinuities close, electricity has an easier time flowing through the sensing element 116 and, thus, the resistance of the sensing element 116 decreases.

Many types of sensing elements exist that change resistance upon flexion and are commonly referred to as bend sensors or flex resistors. Of course, other sensors may also be used in the angle sensor 12. For example, force sensing resistors ("FSRs") are typically used to measure or sense an electrical value corresponding to the amount of force applied to the FSR. However, thin-film FSRs exist that may bend or flex. Although FSRs are configured to change resistance with the amount of force applied thereto, the resistance of the FSRs also changes slightly with flexion. Thus, other sensors with variable resistance that changes with flexion of the sensor may also be configured for use with angle sensor 12.

One exemplary sensing element 116 is a custom sensing element that is produced by Flexpoint Sensor Systems, Inc. of Draper, Utah. With reference to FIG. 5, the sensing element 116 has an approximate length L3 of 1.9 meters, a height L3 of approximately 5 millimeters, and thickness T3 of approximately 0.1 millimeters. The protective laminate 120 is sized larger with respect to length L2 and height H2 such that the protective laminate 120 covers the sensing element 116 and at least a portion of the lead wires 84 and 88. In the illustrated construction, the protective laminate has a length L2 of approximately 2.0 meters, a height of approximately 10 millimeters, and a thickness of approximately 0.1 millimeters. The flat cable 56 has a length L1 of approximately 2.5 meters, a height H1 of approximately 20 millimeters, and a thickness T1 of approximately 0.5 millimeters. Of course, the sensing element 116, the protective laminate 120, and the flat cable 56 can have other lengths, thicknesses, and heights.

In general, the sensing element 116 may have a length L3 that allows the sensing element 116 to make one full revolution around the inner wall 40 when the flat cable 56 is fully wound. In other constructions, the sensing element 116 may have a length L3 that allows the sensing element 116 to make more or less than one full revolution around the inner wall 40 when the flat cable 56 is fully wound. In some constructions, the length L3 of the sensing element 116 is substantially equal to the length L1 of the flat cable 56 (e.g., L3≧0.95 L1). In other constructions, the length L3 may be 25%, 50%, 75%, or some other percentage of the length L1 of the flat cable 56. In some constructions, the sensing element 116 is able to make twelve full revolutions around the inner wall 40 before the sensing element 116 experiences any tension. Thus, even when the flat cable 56 and the sensing element 116 are fully wound (i.e., includes the most number of revolutions around the inner wall 40), the sensing element 116 still does not experience any significant tension and, thus, does not inhibit the movement of the flat cable 56.

The sensing element 116 and the sensor strip 72 are illustrated in FIGS. 1-3 and 5 as being mounted symmetrically with respect to the flat cable 56. The sensor strip 72 and sensing element 116 may be mounted anywhere on the flat cable 56 such that the sensing element 116 experiences flexion due to the movement (e.g., winding and unwinding) of the flat cable 56 in response to rotation of the steering wheel 18.

The flat cable 56 does not necessarily wind and unwind uniformly as the steering wheel 18 rotates with respect to the stationary component 96 of the steering column 16. Thus, the sensing element 116 may not flex uniformly as the flat cable 56 is wound and unwound. If the sensing element 116 experiences uneven flexion, the resistive properties of the sensing element 116 may change non-uniformly and, thus, the electrical value corresponding to the resistance of the sensing element 116 may change non-uniformly even during uniform rotation of the rotatable housing portion 20. In addition, when the sensing element 116 has a length L3 that is substantially less than the length L1 of the flat cable 56 (e.g., L3≦0.50 L1), the sensing element 116 is more sensitive to uneven flexion as the rotatable housing portion 20 rotates. On the other hand, when the sensing element 116 has a length L3 that is substantially equal to the length L1 of the flat cable 56 (e.g., L3≧0.95 L1), the sensing element 116 is less sensitive to uneven flexion as the rotatable housing portion 20 rotates. When the lengths L3 and L1 of the sensing element 116 and the flat cable 56 are approximately equal to each other, the changes in the resistive properties of the sensing element 116 are averaged over the length L3 of the sensing element 116.

Figure 6:
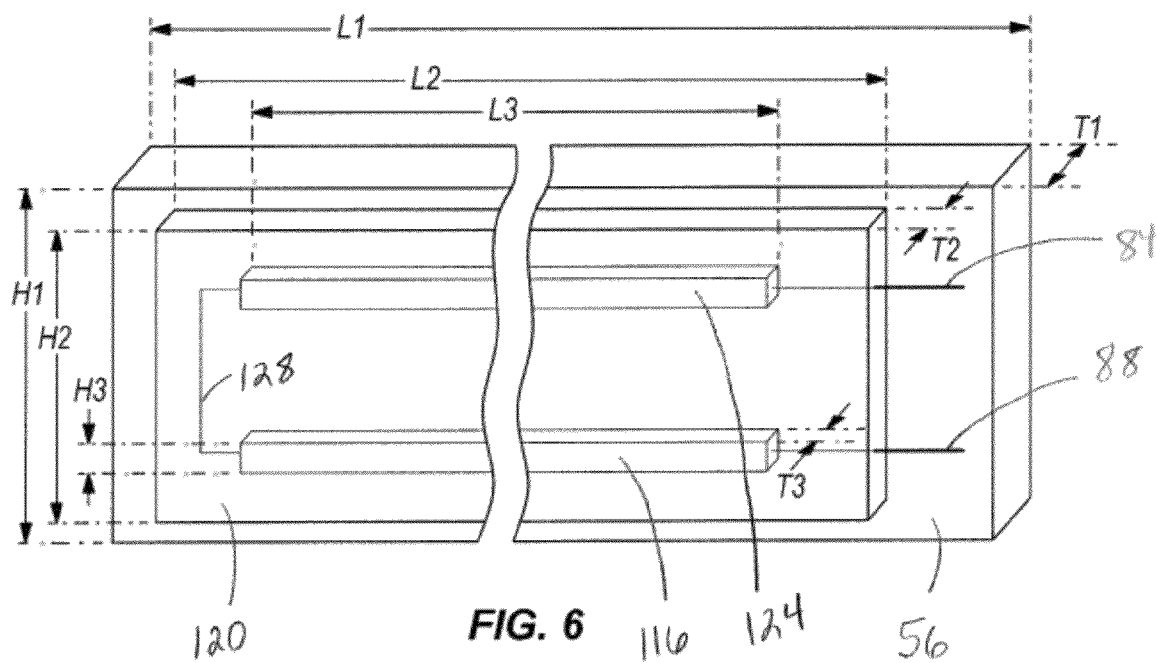
FIG. 6 is a perspective view of two sensing elements mounted to a cable.

As illustrated in FIG. 6, some constructions of the angle sensor 12 include a second sensing element 124. The second sensing element 124 is similar to the first sensing element 116 and is electrically in series with the first sensing element 116. As illustrated, the positive lead wire 84 is connected to one end of the second sensing element 124, and the ground lead wire 88 is connected to one end of the first sensing element 116. An electrically conductive wire 128 electrically connects the other ends of the first and second sensing elements 116, 124. The dimensions (e.g., length, height, and thickness) of the second sensing element 124 are approximately equal to the dimensions (e.g., length L3, height H3, and thickness T3) of the first sensing element 116. Other constructions may include more sensing elements or may include sensing elements of different dimensions.

In operation, an electrical value that corresponds to the resistance of the sensing element 116 is detected or measured and provided to the evaluation circuit 92. The evaluation circuit 92 processes the measured electrical value to determine an angle of rotation between the stationary housing portion 24 and the rotatable housing portion 20 of the angle sensor 12. As discussed, the angle of rotation between the stationary housing portion 24 and the rotatable housing portion 20 corresponds to a steering angle (e.g., the amount of rotation of the steering wheel 18 with respect to the stationary component 96 of the steering column 16).

Figure 7:
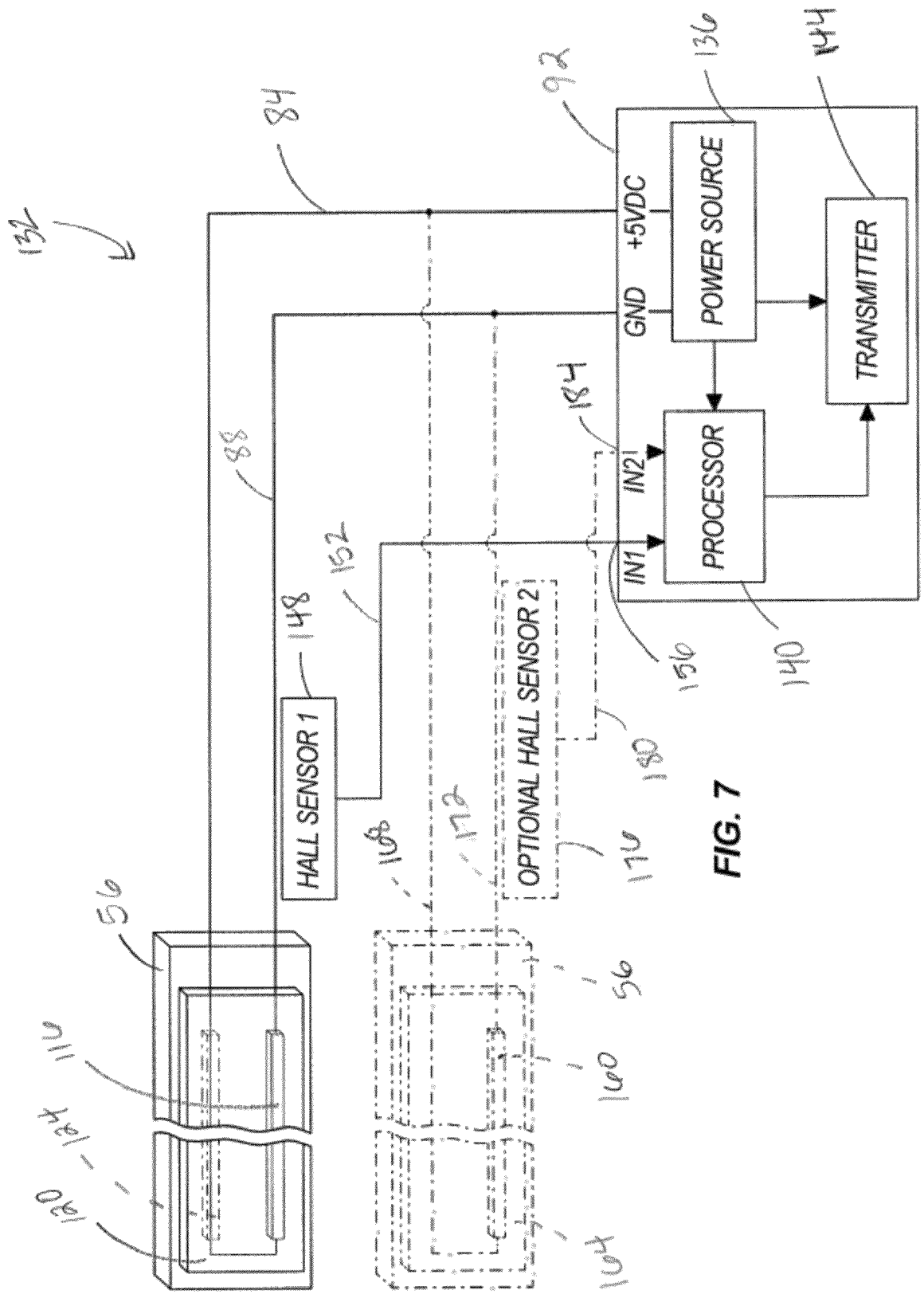
FIG. 7 is a schematic of a circuit diagram of the angle sensing apparatus of FIG. 1.

FIG. 7 schematically illustrates an electrical circuit 132, with optional components illustrated in phantom, which may be used to detect or measure the electrical value. The evaluation circuit 92 includes a power source 136, a processor 140, and a transmitter 144. The power source 136 provides power to the processor 140 and to the transmitter 144. The power source 136 also applies a direct current (DC) voltage (e.g., +5 volts) to the positive lead wire 84 and grounds the ground lead wire 88. The electrical circuit 132 further includes a hall sensor 148 positioned to measure the electrical value corresponding to the resistance of the sensing element 116. As illustrated, the hall sensor 148 is positioned adjacent the ground lead wire 88 such that the hall sensor 148 senses or measures the electrical value corresponding to the resistance of the sensing element 116 and outputs a measured signal 152. The input 156 of the processor 140 receives the measured signal 152. The processor 140 determines an angle of rotation based on the measured signal. Of course, other suitable methods may be used to measure an electrical value related to the resistance of the sensing element 116. As such, the invention is not limited to the user of a hall sensor for measuring the electrical value.

More specifically, with reference to the embodiment depicted in FIG. 7, a known voltage is applied to the positive lead wire 84 and the hall sensor 148 measures the current through the sensing element 116. The hall sensor 148 outputs a measured voltage or measured signal 152 that corresponds to the measured current through the sensing element 116. The processor 140 receives the measured signal 152 and determines the corresponding resistance value of the sensing element 116. The processor 140 uses the resistance value to determine the amount of rotation. The processor 140 includes a memory and a look-up table saved in the memory. The look-up table includes empirically determined values of the resistance of the sensing element 116 and corresponding angles of rotation. The processor 140 compares the determined resistance value to the resistance values located in the look-up table. If a match is found, the angle of rotation corresponding to the matching resistance value in the look-up table is retrieved from memory and is determined to be the angle of rotation for the measured signal 152. If an exact match is not found, the resistance value in the look-up table that is closest (i.e., nearest in value) to the determined resistance is considered to be the matching resistance. The processor 140 outputs the angle of rotation to the transmitter 144, and the transmitter 144 outputs the angle of rotation to the vehicle electronic control unit or other hardware that uses the angle of rotation. The transmitter 144 may transmit the angle of rotation wirelessly or through a wired connection. In other constructions, a mathematical model can be developed that describes the relationship of the angle of rotation to the sensed electrical value. When a mathematical model is used, the processor 140 receives the measured signal 152 and uses the mathematical model to calculate the angle of rotation.

If a second sensing element 124 is coupled to the flat cable 56, the hall sensor 148 measures an electrical value that corresponds to the average resistance of the first and second sensing elements 116 and 124. The hall sensor 148 outputs a measured signal 152 corresponding to the average resistance of the first and second sensing elements 116 and 124. The processor 140 receives the measured signal 152 at the input 156 and uses the measured signal 152 to determine the angle of rotation. The processor 140 can use a look-up table or a mathematical model, as described above, to determine the angle of rotation.

The sensing elements 116 and 124 can be susceptible to environmental factors, such as humidity, temperature, etc. The environmental factors may change the properties of the sensing element 116. For example, with high changes in temperature, the resistance of the sensing element 116 changes even when held in a stationary position, without flexion. In some instances, the resistance of the sensing element 116 may change ±10%. Thus, to compensate for changes in environmental factors, an additional sensing element may be used as a reference sensing element 160 to correct for changes in electrical resistance of the sensing element 116 due solely to changes in the environmental factors. For example, if the resistance of the sensing element 116 and the resistance of the reference sensing element 160 both increase due to a change in temperature, then the measured values 152 and 180 change. The processor may include a table with a list of correction values corresponding to the measured value 180 of the reference sensing element 160, which is substantially constant during operation because the reference sensing element 160 is stationary during operation. The processor 140 uses the correction value to correct the measured value 152 and determines an angle of rotation that more accurately reflects the actual angle of rotation, regardless of changes in resistance of the sensing element 116 due to the effects of environmental factors.

The reference sensing element 160 may be used to calibrate the angle sensor 12 in the following manner. During determination of the look-up table, the average measured value 180 corresponding to the resistance of the reference sensing element 160 can be saved in the memory of the processor 140. During operation, the processor 140 receives the measured value 180 and compares it to the previously saved measured value. If the measured value 180 and the previously saved measured value are not equal, then the processor 140 uses the table to determine a corresponding correction value. The correction value is used to correct the measured signal 152 corresponding to the resistance of the sensing element 116, and the corrected value is used to determine the angle of rotation in a similar manner as described above.

The reference sensing element 160 may also be used when a greater degree of accuracy is desired. The reference sensing element 160 is optionally mounted to the stationary housing portion 24 of the angle sensor housing 14 by a lamination layer 164. In other constructions, the reference sensing element 160 may be mounted on a portion of the flat cable 56 that is stationary during rotational movement of the rotatable housing portion 20 and the steering wheel 18. The reference sensing element 160 may be mounted to the stationary housing portion 24 by other suitable methods, such as adhesive.

A second positive lead wire 168 is connected between the first positive lead wire 84 and the reference sensing element 160 such that when a DC voltage is applied to the first positive lead wire 84, the voltage is also applied to the second positive lead wire 168. Similarly, a second ground lead wire 172 is connected at one end to the first ground lead wire 88 and at the other end to the reference sensing element 160. A second hall sensor 176 is positioned adjacent the second ground lead wire 172 for measuring a reference electrical value corresponding to the resistance of the reference sensing element 160. The second hall sensor 176 outputs a second measured signal 180 that corresponds to the resistance of the reference sensing element 160. The processor 140 receives the second measured signal 180 at a second input 184. The processor 140 uses the second measured signal 180 to adjust the first measured signal 152 and to compensate for environmental factors, such as those described above, which can change the properties of the sensing elements 116, 124, and 160.

Figure 8:
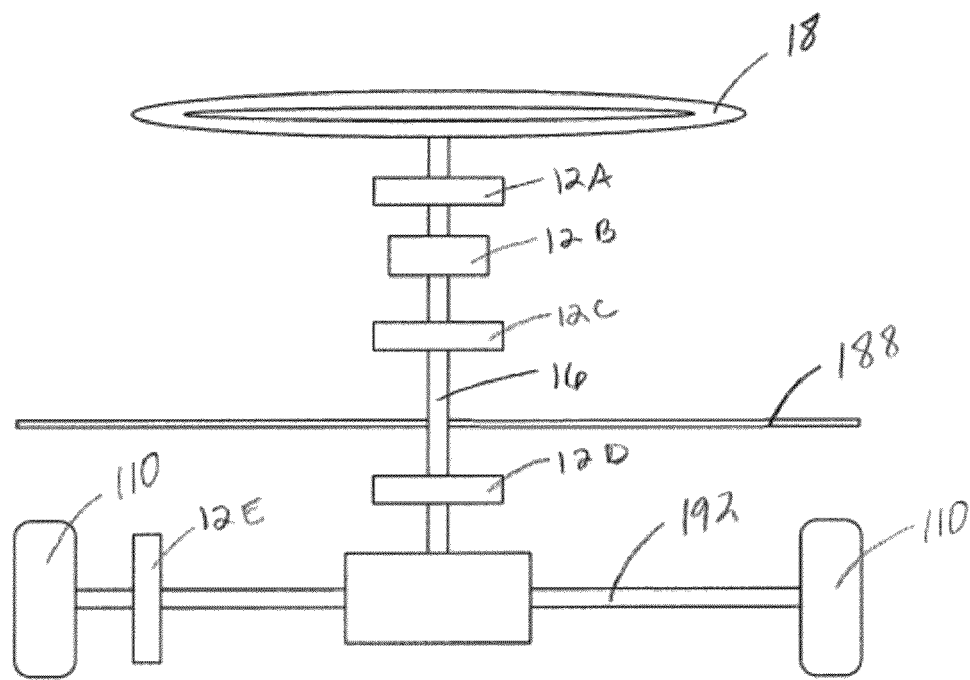
FIG. 8 is a schematic that illustrates different mounting positions of an angle sensing apparatus in accordance with the invention.

The angle sensor 12 contains electrical components that are not as heat-sensitive as electrical components contained in typical angle sensing devices. Thus, the angle sensor 12 can withstand temperatures up to approximately 150 degrees Celsius, and the angle sensor 12 can be positioned below a heat shield 188 of the vehicle. For example, as schematically illustrated in FIG. 8, the angle sensor 12A, 12B, 12C, 12D, 12E can be positioned substantially anywhere along the steering column 16 or a driveshaft 192 of the vehicle.

Thus, the invention provides, among other things, an angle sensor for determining an amount of rotation of a rotatable component rotating with respect to a stationary component. Also, the invention provides a vehicle incorporating an angle sensor. The invention also provides a method of sensing an angle of rotation. Various features and advantages of the invention are set forth in the following claims.

What is claimed is:

1. An apparatus for determining an amount of rotation of a rotatable component rotating with respect to a stationary component, the apparatus comprising:
    a cable with a first end fixed to the rotatable component and a second end fixed to the stationary component, the cable configured to wind or unwind when the rotatable component rotates with respect to the stationary component; and
    a sensing element supported by the cable, the sensing element extending along a length of the cable and configured to flex in response to the winding or unwinding of the cable, the sensing element having a resistance that changes in response to flexion of the sensing element; and
    an evaluation circuit in communication with the sensing element and configured to determine a value having a relation to the resistance and determine the amount of rotation based on the value.

2. The apparatus of claim 1, wherein the evaluation circuit further includes a processor that determines the amount of rotation based on the value.

3. The apparatus of claim 1, wherein the sensing element consists of a single sensing element.

4. The apparatus of claim 1, wherein the apparatus further comprises a second sensing element supported by the cable, the second sensing element extending along the length of the cable and configured to flex in response to the winding or unwinding of the cable, the second sensing element having a second resistance that changes in response to flexion of the second sensing element, wherein the second sensing element is electrically connected in series with the first sensing element, and wherein the evaluation circuit is connected to the first and second sensing element to determine the value based on a relation to the first and second resistance.

5. The apparatus of claim 1, wherein the apparatus further comprises a reference sensing element secured to the stationary component and not subject to flexion, the reference sensing element having a second resistance, and wherein the evaluation circuit is further connected to the reference sensing element and further configured to determine a second value having a relation to the second resistance and to determine the amount of rotation further based on the second value.

6. The apparatus of claim 5, wherein the evaluation circuit determines a correction value based on the second value.

7. The apparatus of claim 1, wherein the rotatable component is a steering wheel and the stationary component is a steering column.

8. The apparatus of claim 1, wherein the evaluation circuit is supported by the stationary component.

9. A vehicle comprising:
a drive shaft configured to drive a wheel of the vehicle;
a steering column including a movable component and a stationary component, the movable component coupled to the drive shaft;
a steering device coupled to the movable component and configured to move the movable component with respect to the stationary component; and
an angle sensor configured to determine an amount of rotation of the movable component with respect to the stationary component, the angle sensor including
a housing that includes a movable housing portion and a stationary housing portion;
a strip of material with a first end fixed to the movable housing portion and a second end fixed to the stationary housing portion, the strip of material configured to wind or unwind when the movable housing portion moves with respect to the stationary housing portion;
a sensing element supported by the strip of material, the sensing element extending along a length of the strip of material and configured to flex in response to the movement of the strip of material, the sensing element having a resistance that changes in response to flexion of the sensing element; and
an evaluation circuit connected to the sensing element and configured to determine an electrical value having a relation to the resistance and determine the amount of rotation based on the electrical value.

10. The vehicle of claim 9, wherein the evaluation circuit further includes a processor configured to determine the amount of rotation based on the electrical value.

11. The vehicle of claim 9, wherein the sensing element consists of a single sensing element.

12. The vehicle of claim 9, wherein the sensing element includes a first resistive element and a second resistive element, the first resistive element and the second resistive element connected in series.

13. The vehicle of claim 9, wherein the angle sensor further comprises a reference sensing element secured to the stationary component and not subject to flexion, the reference sensing element having a second resistance, and wherein the evaluation circuit is further connected to the reference sensing element and further configured to determine a reference electrical value having a relation to the second resistance and to determine the amount of movement further based on the reference electrical value.

14. The vehicle of claim 13, wherein the evaluation circuit determines a correction value based on the reference electrical value, determines an electrical value having a relation to the resistance, corrects the electrical value based on the correction value to determine a corrected electrical value, and determines the amount of rotation based on the corrected electrical value.

15. The vehicle of claim 9, further comprising a sensor positioned in the steering device, wherein the strip of material is an electrical cable configured to provide an electrical connection between the sensor and a stationary electrical component.

16. The vehicle of claim 9, wherein the evaluation circuit is supported by the stationary housing portion.

17. A method of sensing an angle of rotation using an angle sensor, the angle sensor including a strip of material with a first end fixed to a stationary component and a second end fixed to a rotary component that rotates with respect to the stationary component, the method comprising:
moving a sensing element mounted on the strip of material such that the sensing element flexes in response to rotation of the rotary component, the sensing element having a resistance that changes in response to flexion of the sensing element;
sensing an electrical value that has a relation to the resistance of the sensing element; and
determining the amount of rotation from the electrical value.

18. The method of claim 17, wherein determining the amount of rotation further includes;
comparing the electrical value to a plurality of electrical values in a table, each of the plurality of electrical values corresponding to an amount of rotation,
matching the electrical value to one of the plurality of electrical values, and
selecting the amount of rotation that corresponds to the one of the plurality of electrical values.

19. The method of claim 17, wherein determining the amount of rotation further includes calculating the amount of rotation based on a mathematical model.

20. The method of claim 17, wherein the resistance further changes in response to a change in an environmental factor, the method further including;
sensing a reference electrical value of a reference sensing element mounted on the stationary component, the reference sensing element having a reference resistance that changes in response to the change in the environmental factor, the reference electrical value having a relation to the reference resistance; and
determining the amount of rotation from the electrical value and the reference electrical value.

* * * * *